United States Patent [19]

Stjernholm

[11] 4,281,965

[45] Aug. 4, 1981

[54] CANTILEVER MOUNTED WIND TURBINE

[76] Inventor: Dale T. Stjernholm, 1490 Tari Dr., Colorado Springs, Colo. 80908

[21] Appl. No.: 36,420

[22] Filed: May 7, 1979

[51] Int. Cl.³ .............................................. F03D 3/06
[52] U.S. Cl. ................................ 416/227 A; 416/135; 64/10
[58] Field of Search ............ 416/227 A, DIG. 6, 135; 64/10, 11 F, 23, 23.5

[56] References Cited

U.S. PATENT DOCUMENTS

| 18,412 | 10/1857 | Reeder | 64/10 |
| 1,264,742 | 4/1918 | Aldrich | 64/10 X |
| 1,712,149 | 5/1929 | Kolozsy | 416/DIG. 6 X |
| 2,453,383 | 11/1948 | Rathman | 64/10 X |
| 2,784,556 | 3/1957 | Perdue | 416/DIG. 6 |
| 3,918,839 | 11/1975 | Blackwell et al. | 416/227 A |
| 4,082,479 | 4/1978 | Rangi et al. | 416/227 A |

FOREIGN PATENT DOCUMENTS

| 1054225 | 2/1954 | France | 416/135 A |
| 2298707 | 8/1976 | France | 416/227 A |
| 7514750 | 6/1977 | Netherlands | 416/DIG. 4 |
| 7606729 | 12/1977 | Netherlands | 416/227 A |
| 579468 | 11/1977 | U.S.S.R. | 64/10 |

Primary Examiner—Everette A. Powell, Jr.
Attorney, Agent, or Firm—Richard W. Hanes

[57] ABSTRACT

A cantilever mounted wind turbine having an interior stationary support column and a concentrically mounted rotatable rotor and having a first bearing between the support column and the rotor and a second flexibly coupled bearing between the support column and the rotor where the second bearing includes bearing surfaces and a flexible coupling between one of the bearing surfaces and the rotor in order to provide bending moment decoupling between the rotor and its support column.

4 Claims, 7 Drawing Figures

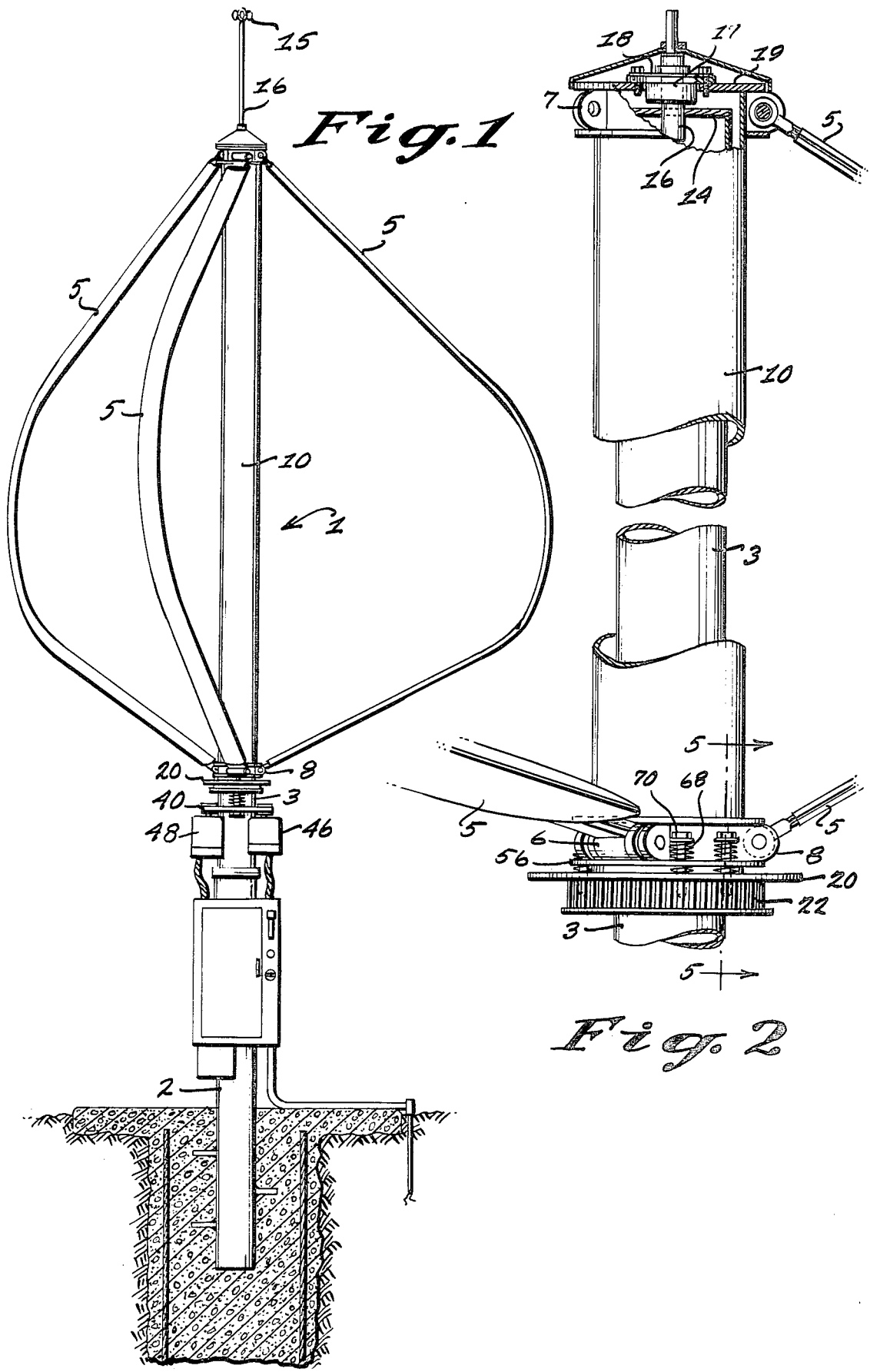

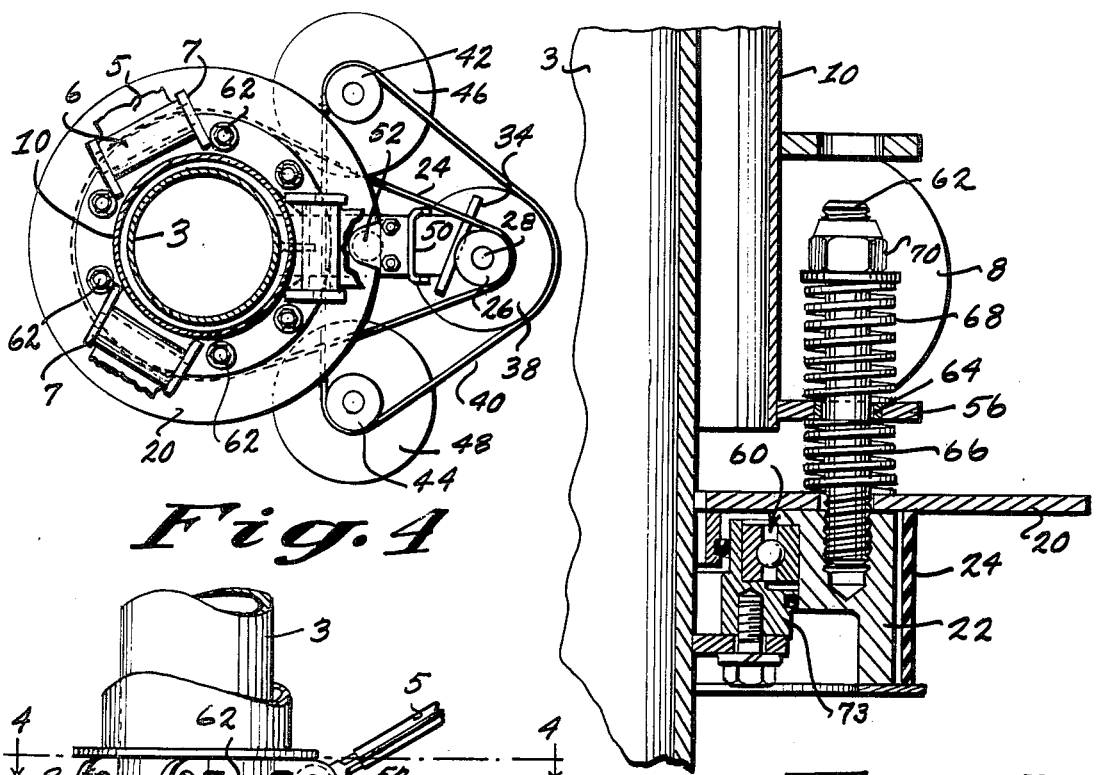
Fig. 4
Fig. 5
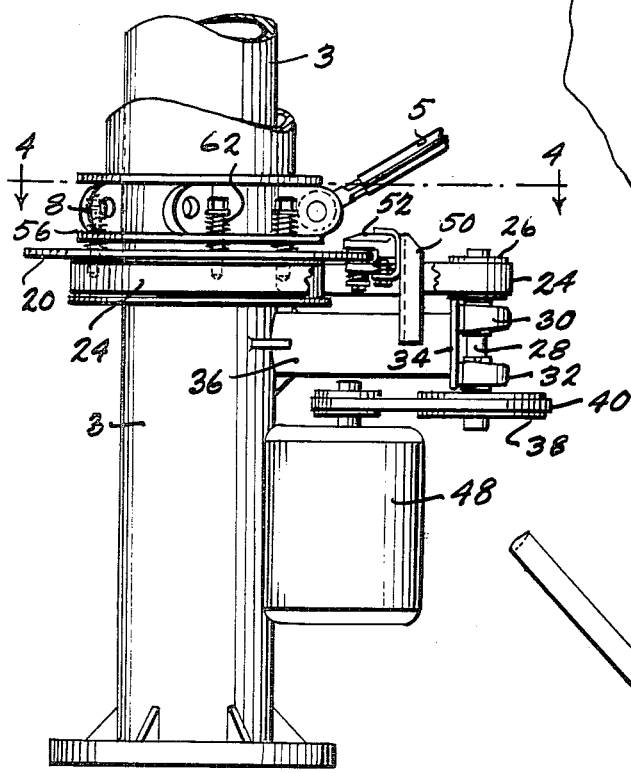
Fig. 3
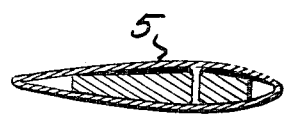
Fig. 7
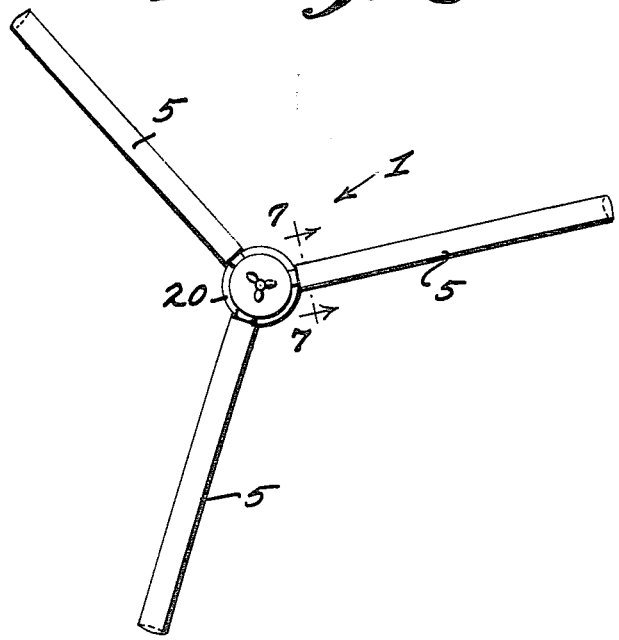
Fig. 6

CANTILEVER MOUNTED WIND TURBINE

BACKGROUND OF THE INVENTION

The present invention relates to apparatus for the cantilever mounting of a fluid turbine of the type having its rotating shaft transverse to the flow of fluid currents, such as air, sometimes referred to as a Darrieus turbine. In 1931, G. J. M. Darrieus disclosed, in U.S. Pat. No. 1,835,018, a three-bladed wind turbine mounted on a vertical rotating shaft. Since that time, and especially recently, the Darrieus turbine has received substantial attention as an effective means of power conversion. Using a single turbine for high power generation, however, creates the need for a large turbine with the requisite elongated shaft. Many efforts have been made to solve the bending problems associated with ever increasing shaft lengths, one of the foremost of which is guying the shaft from the top. Obviously, the whirling blades create the need for large guy angles and considerable ground space for a turbine installation. A cantilever mounted turbine shaft which is either resistant to or tolerant of bending would greatly enhance the usefulness of such devices.

SUMMARY OF THE INVENTION

Accordingly, it is the primary purpose of the present invention to provide a cantilever type of mounting for the rotating shaft of a Darrieus wind turbine which will tolerate the bending and cocking which must occur with a reasonably designed and proportioned turbine shaft.

A second object of the invention is to provide a cantilever mounting for a rotating vertical turbine shaft which will readily and effectively lend itself to a power takeoff and generator mounting on the same vertical support member which carries the rotating turbine shaft.

Another object of the invention is to provide a torque transmitting coupling between the fixed support column of the fluid turbine and the rotor thereof which movement decouples the rotor shaft and the lower bearing support to allow the centerlines of the support column and the rotor to become unparallel without significantly stressing or deflecting the brake or power takeoff components or binding or point loading the lower bearing.

A further object of the invention is to provide both thrust and radial support for the rotor of a cantilever mounted fluid turbine of the type described.

A still further object of the invention is to provide a torque transmission coupling which may operate without the maintenance of continually parallel or perpendicular elements, thus eliminating the need for close manufacturing tolerances in making the parts.

Other and further objects, features and advantages of the present invention will become apparent from a reading of the following description of a preferred form of the invention taken in conjunction with the accompanying drawings.

BRIEF DESCRIPTION OF THE DRAWINGS

FIG. 1 is an elevational view of the wind turbine of the present invention with the concrete foundation and earth broken away and shown in cross section.

FIG. 2 is an enlarged fragmentary view of the shaft of the wind turbine with parts thereof broken away and shown in cross section.

FIG. 3 is an enlarged fragmentary view of the support column of the wind turbine of the present invention primarily illustrating the joint take-off apparatus and electrical generators.

FIG. 4 is a cross sectional view taken along line 4—4 of FIG. 3.

FIG. 5 is an enlarged fragmentary cross section taken along line 5—5 of FIG. 2.

FIG. 6 is a top plan view of the fluid turbine of the present invention.

FIG. 7 is a cross sectional view of a typical blade of the wind turbine taken along lines 7—7 of FIG. 6.

DESCRIPTION OF THE PREFERRED EMBODIMENT

The improved Darrieus wind turbine 1 of the present invention is seen generally illustrated in FIG. 1 as having a fixed vertical stand 2 onto which is rigidly coupled a support column 3. The turbine comprises three troposkien shaped blades 5 pivotally fastened by eyes 6 at their ends to upper and lower ear sets 7 and 8 which are carried by the turbine rotor shaft 10 co-axially mounted for rotation on the stationary support column 3.

The bearing arrangement between the shaft 10 and the column 3 at the top of the shaft is different from that at the bottom of the shaft which accounts for the ability of the device to tolerate support column bending or deflection. FIG. 2 illustrates the construction of the top bearing arrangement. The support column 3 is provided with a cover plate 14 which supports a vertical fixed spindle 16. The upper portion of the spindle 16 is journalled in a roller bearing 17 which is mounted in an annular flange 18 disposed around a central bore in the cover plate 19 rigidly fixed to the top end of the turbine rotor 10. In addition to its primary function as a fixed journal, the shaft 16 may be used to support instrumentation 15 above the turbine, such as as anemometer.

Coupled to the lower end of the rotor shaft 10 is a flat horizontally disposed annular brake disc 20 which carries a circular belt sprocket 22 depending therefrom. A two-stage speed increaser is provided by an arrangement of drive components, including a power take-off drive belt 24 trained around the sprocket 22 which also engages a small driven sprocket 26 mounted on a jack shaft 28 journalled in a pair of pillow block bearings 30 and 32. The pillow block bearings are adjustably attached to an obliquely positioned mounting plate 34 secured to the end of a tubular bracket 36 which projects from and is attached to the support column 3. The lower end of the jack shaft 28 carries a belt sprocket 38 which provides the necessary driving force for the generator drive belt 40 which is operably connected to the drive sprockets 42 and 44 of the drive shafts of a pair of generators 46 and 48, also carried by the support column 3. The tubular bracket 36 also provides a platform for the mounting bracket 50 of the brake caliper 52 which applies pressure to the brake disc 20 in a manner well known in the art.

The objectives incident to moment decoupling between the rotor 10 and the support column 3 are achieved by the novel spring biased connection between the lower rotor flange 56 and the combined brake disc 20 and drive sprocket 22, as shown best in FIG. 5 of the drawings. The arrangement allows the support column 3 to bend above the lower bearing mount and thus cock the rotating turbine rotor 10 while efficiently transmitting torque and without significantly stressing or deflecting the brake disc 20 or the master sprocket 22 or binding or point loading the lower bearing 60.

It will be seen that if the support column 3 bends, the attachment of the rotor 10 to the top of the support column 3 will cause the rotor 10 to cock, tending to produce misalignment and unparallel relations between the support column 3 and the rotor 10. Without a flexible coupling in the system, the lower bearing would tend to bind because of such stress and the brake disc and power take-off components would likewise tend to become askew and would fail to maintain a proper relationship with their associated parts.

To overcome these problems caused by the cocking of the rotor 10, there is provided a plurality of angularly spaced apart coupling studs or bolts 62 which are disposed in slightly enlarged holes in the lower rotor flange 56 which is fixed to the rotor. A bearing sleeve bushing 64 is provided between the stud 62 and the hole in flange 56.

Each of the coupling studs 62 is threadingly engaged to the interior flange of the main power take-off sprocket 22. A helical spring 66 is disposed around the stud 62 in the space between the brake disc 20 and the stud mounting flange 56. A similar spring 68 is provided between the top of the rotor flange 56 and a head or nut 70 threaded to the stud 62 and spaced apart from the rotor lower flange 56. With the springs 66 and 68 on the top and bottom respectively of the flange 56, it will be seen that the rotor 10 and its attached flange can cock with respect to the longitudinal axis of the coupling stud 62 with the drive sprocket 22 receiving negligible bending moment. The ball bearing unit 60 has its inner race carried by a block 73 which is fixed to the support column 3 and its outer race is carried by the inner flange of the sprocket 22. Inasmuch as the moment decoupling which is provided by the spring and stud arrangement just described produces no significant bending on the sprocket 22, similarly, there is no misaligning stresses on the brake disc 20 and no binding felt in the bearing 60.

I claim:

1. A moment decoupling connection between first and second concentrically mounted and respectively rotatably members, including:
    radial thrust bearing means having first and second bearing surfaces;
    means securing the first bearing surface to the said first member; and
    means flexibly coupling the second bearing surface to the said second member including:
        a pair of spaced apart flanges; a plurality of circumferentially equi-spaced torque transmitting drive pin means interconnecting the flanges; and
        elastic cushioning means disposed between the flanges.

2. In a self-supporting fluid turbine having a rotor shaft, a plurality of elongated blades and means attaching the ends of said blades to longitudinally spaced apart points on said rotor shaft, the improvement comprising:
    an anchored support column interiorially nested within the said rotor shaft;
    first and second bearing means interconnecting the said column and the shaft and adapted to accomodate relative rotation therebetween and including:
        first and second torque transmitting drive flanges, the first of said flanges attached to the said rotor shaft and the second of said flanges attached to said second bearing means;
        a plurality of flange pins interconnecting the flanges, and
        cushioning means disposed between the flanges.

3. The combination of claim 2 wherein the cushioning means includes spring means coiled around each of the said flange pins.

4. The combination of claim 2 wherein the plane of the annular flanges is perpendicular to the axis of rotation of the rotor shaft.

* * * * *